(12) United States Patent
Itaya et al.

(10) Patent No.: US 12,512,727 B2
(45) Date of Patent: Dec. 30, 2025

(54) DRIVE SYSTEM

(71) Applicant: Hitachi Astemo, Ltd., Hitachinaka (JP)

(72) Inventors: Takaki Itaya, Ibaraki (JP); Noriyuki Maekawa, Ibaraki (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 439 days.

(21) Appl. No.: 17/766,915

(22) PCT Filed: Sep. 8, 2020

(86) PCT No.: PCT/JP2020/033880
§ 371 (c)(1),
(2) Date: May 20, 2022

(87) PCT Pub. No.: WO2021/070535
PCT Pub. Date: Apr. 15, 2021

(65) Prior Publication Data
US 2022/0416624 A1    Dec. 29, 2022

(30) Foreign Application Priority Data
Oct. 7, 2019 (JP) ................. 2019-184613

(51) Int. Cl.
*H02K 9/19* (2006.01)
*F01N 3/20* (2006.01)
*H02K 7/116* (2006.01)

(52) U.S. Cl.
CPC ............. *H02K 9/19* (2013.01); *F01N 3/2006* (2013.01); *H02K 7/116* (2013.01)

(58) Field of Classification Search
CPC .. H02K 9/00; H02K 9/04; H02K 8/10; H02K 8/12; H02K 8/16; H02K 8/18; H02K 8/19;
(Continued)

(56) References Cited

U.S. PATENT DOCUMENTS 4,391,235 A    7/1983    Majkrzak
6,427,793 B1 *  8/2002    Hanada ..................... B60K 6/20
                                                                180/65.2
(Continued)

FOREIGN PATENT DOCUMENTS

CN    103633775 A    3/2014
CN    109291910 A    2/2019
(Continued)

OTHER PUBLICATIONS

U.S. Appl. No. 17/766,915, filed Jul. 4, 2024_DE_102014009293_A1_H.pdf (Year: 2024).*
(Continued)

*Primary Examiner* — Christopher M Koehler
*Assistant Examiner* — Ahmed F Seck
(74) *Attorney, Agent, or Firm* — Crowell & Moring LLP (57) ABSTRACT

An object of this invention is to efficiently warm up a catalyst and keep its temperature. Provided is a drive system, including: an internal combustion engine; a catalytic unit configured to purify an exhaust gas from the internal combustion engine; a motor used for at least one of drive or regeneration; and a flow path formed so as to allow an oil-based medium for lubricating the motor to flow in the vicinity of the catalytic unit. The oil-based medium is heated in the motor and exchanges heat in the catalytic unit to heat the catalytic unit.

6 Claims, 7 Drawing Sheets

(58) Field of Classification Search
CPC .......... H02K 8/193; H02K 8/197; H02K 5/12;
H02K 7/116; F02N 19/10; F02N 17/02;
F02N 11/04; F02N 11/0833; F02N
11/0837; F02N 2200/026; F02N 2200/12;
F02N 2200/125; B60K 6/20; B60K
6/365; B60K 6/445; B60K 6/22; B60K
6/24; B60K 6/48; B60K 6/485; B60K
6/543; B60K 6/00; B60K 6/26; B60K
6/38; B60K 6/405; B60K 6/44; B60K
6/52; B60K 6/442; B60K 6/547; B60K
6/387; B60K 1/02; B60K 2006/268;
B60K 2006/4808; B60K 2006/4825;
B60W 10/06; B60W 10/08; B60W 10/18;
B60W 10/20; B60W 20/00; B60W 20/10;
B60W 20/15; B60W 20/16; B60W
2510/068; B60W 2530/12; B60W 30/20;
B60W 2030/203; B60W 2420/403; B60W
2420/408; B60W 2510/1035; B60W
2520/10; B60W 2520/105; B60W
2520/125; B60W 2520/14; B60W
2540/10; B60W 2540/12; B60W 2540/18;
B60W 2552/00; B60W 2552/05; B60W
2552/10; B60W 2552/15; B60W 2552/40;
B60W 2552/53; B60W 2554/4026; B60W
2554/4029; B60W 2555/60; B60W
2556/50; B60Y 2200/92; B60Y 2400/48;
B60Y 2400/42; B60Y 2306/03
See application file for complete search history.

(56) References Cited

U.S. PATENT DOCUMENTS

| 11,156,197 | B1* | 10/2021 | Lew ........................ F01L 1/344 |
| 2004/0007403 | A1* | 1/2004 | Tomatsuri .............. B60K 6/445 |
| | | | 180/65.235 |
| 2008/0120019 | A1* | 5/2008 | Inoue ...................... F02N 11/08 |
| | | | 60/299 |
| 2010/0043414 | A1* | 2/2010 | Hirose .................... B60K 6/365 |
| | | | 60/320 |
| 2011/0021312 | A1* | 1/2011 | Fukitani .............. F02D 41/0215 |
| | | | 180/65.265 |
| 2012/0006622 | A1* | 1/2012 | Will ........................ F01M 5/001 |
| | | | 184/6.22 |
| 2015/0280524 | A1* | 10/2015 | Lassila ................... B60K 11/02 |
| 2016/0160775 | A1* | 6/2016 | Endo .................... F02D 13/0234 |
| | | | 701/113 |
| 2018/0086349 | A1* | 3/2018 | Hiwatashi ............. B60W 40/10 |
| 2019/0031172 | A1 | 1/2019 | Kodera et al. |
| 2019/0040782 | A1* | 2/2019 | Zenner .................... F01N 13/16 |
| 2019/0070948 | A1* | 3/2019 | Nishida ................... B60K 6/44 |
| 2019/0168739 | A1* | 6/2019 | Morisaki ............... B60K 6/445 |
| 2019/0291570 | A1 | 9/2019 | Tang et al. |
| 2019/0338688 | A1* | 11/2019 | Crawford ............. F01N 3/0222 |
| 2021/0379979 | A1* | 12/2021 | Toda .................. F01M 11/0004 |

FOREIGN PATENT DOCUMENTS

| DE | 102014009293 A1 * | 12/2015 | ............ B60K 6/387 |
| DE | 10 2014 218 453 A1 | 3/2016 | |
| JP | 6-276614 A | 9/1994 | |
| JP | H1193643 A * | 4/1999 | |
| JP | 2000-265910 A | 9/2000 | |
| JP | 2008-92727 A | 4/2008 | |
| JP | 2008121466 A * | 5/2008 | ............ F01D 25/16 |
| JP | 2008-247084 A | 10/2008 | |
| JP | 2017-227163 A | 12/2017 | |
| JP | 6315143 B1 | 4/2018 | |
| JP | 2019-43427 A | 3/2019 | |
| WO | WO-2016062395 A1 * | 4/2016 | ........... F01N 3/2066 |

OTHER PUBLICATIONS

JP 2008121466 A—Translation (Year: 2024).*
U.S. Appl. No. 17/766,915, filed Nov. 25, 2024_WO_2016062395_A1_H.pdf (Year: 2024).*
U.S. Appl. No. 17/766,915, filed Mar. 29, 2025_JP_H1193643_A_H.pdf (Year: 2025).*
International Search Report (PCT/ISA/210) issued in PCT Application No. PCT/JP2020/033880 dated Nov. 24, 2020 with English translation (six (6) pages).
Japanese-language Written Opinion (PCT/ISA/237) issued in PCT Application No. PCT/JP2020/033880 dated Nov. 24, 2020 with English translation (eight (8) pages).
Chinese-language Office Action issued in Chinese Application No. 202080079473.9 dated Jan. 24, 2025 with partial English translation (12 pages).
European Office Action issued in European Application No. 20 873 794.0 dated Sep. 2, 2025 (7 pages).

* cited by examiner

DRIVE SYSTEM

BACKGROUND OF THE INVENTION

This invention relates to a drive system, and more particularly, to a drive system including a motor and an engine.

A vehicle including an engine warms up a three-way catalyst with a high-temperature exhaust gas emitted from the engine. Meanwhile, a vehicle including an engine and a motor, such as a hybrid vehicle, less frequently uses the engine to travel, and thus cannot sufficiently warm up the three-way catalyst with an exhaust gas. As a result, a temperature of the catalyst may decrease to lower exhaust-gas purification performance.

Examples of the background art of this technical field include Patent Literature 1 (JP H6-276614A). In Patent Literature 1, there is described a drive apparatus for a hybrid vehicle, which includes a power generator, a battery, an electric motor, a power conversion controller, a heating means, a temperature detecting means, and a refrigerant flow-path switching means. The power generator is rotationally driven by an engine to generate electric power. The battery converts an output from the power generator into DC power, and stores the DC power. The electric motor generates a driving force by using the power generator and the battery as power sources. The power conversion controller controls the electric motor. The heating means collects heat generated in the power conversion controller and the electric motor, and heats an engine-associated component. The temperature detecting means detects a temperature of the engine-associated component. The refrigerant flow-path switching means switches a flow path for refrigerant being the heating means based on the temperature detected by the temperature detecting means.

Further, in Patent Literature 2 (JP 2017-227163A), there is described a temperature raising apparatus including a retarder, an exhaust pipe, an exhaust-gas purification device, a refrigerant circulation pipe, and a pump. The retarder applies a braking force to a drive system of a vehicle when the vehicle decelerates. The exhaust pipe allows an exhaust gas from an engine mounted in the vehicle to flow therethrough. The exhaust-gas purification device includes a casing provided in the exhaust pipe, and the casing contains an exhaust-gas purification catalyst. The refrigerant circulation pipe includes a first heat exchange pipe portion, a second heat exchange pipe portion, a first connection pipe portion, and a second connection pipe portion, and encloses refrigerant therein. The first heat exchange pipe portion is mounted to an outer periphery of the retarder. The second heat exchange pipe portion is mounted to an outer periphery of the casing or on an outer periphery of the exhaust pipe so as to be located on an upstream side of the casing. The first connection pipe portion couples an outlet portion of the first heat exchange pipe portion and an inlet portion of the second heat exchange pipe portion to each other. The second connection pipe portion couples an outlet portion of the second heat exchange pipe portion and an inlet portion of the first heat exchange pipe portion to each other. The pump is driven to pump the refrigerant into the refrigerant circulation pipe and circulate the refrigerant therethrough when the retarder is actuated.

Still further, in Patent Literature 3 (JP2000-265910A), there is described a hybrid vehicle including a self-ignition type gasoline engine, a motor generator, and a battery. The battery drives the motor generator. Output torque from the engine and the motor generator is transmitted to drive wheels via a transmission. The hybrid vehicle further includes a first chamber, a second chamber, a waste-heat absorbing means, a waste-heat guiding means, and an intake-air temperature raising means. The first chamber and the second chamber are provided in series on an upstream side in an intake air passage of the engine. The waste-heat absorbing means absorbs waste heat from at least one of the engine, the motor generator, and the transmission. The waste-heat guiding means guides the absorbed waste heat into the first chamber to raise an intake-air temperature in the first chamber. The intake-air temperature raising means raises an intake-air temperature in the second chamber with use of electric energy supplied from the battery.

SUMMARY OF THE INVENTION

In the above-mentioned related art, cooling water for the engine is used to warm up the catalyst. Thus, the cooling water has a low temperature, and is given at merely about 65° C. to 90° C. As a result, a temperature of the catalyst does not sufficiently rise, providing only small effects of warming up the catalyst and keeping its temperature. Thus, a drive system capable of more efficiently warming up the catalyst and keeping its temperature is desired.

A representative one of the invention disclosed in this application is outlined as follows. There is provided a drive system including: an internal combustion engine; a catalytic unit configured to purify an exhaust gas from the internal combustion engine; a motor used for at least one of drive or regeneration; and a flow path formed so as to allow an oil-based medium for lubricating the motor to flow in the vicinity of the catalytic unit, wherein the oil-based medium is heated in the motor and exchanges heat in the catalytic unit to heat the catalytic unit.

According to one aspect of this invention, fuel consumption for warming up the catalyst and keeping its temperature can be reduced. Problems, configurations, and effects other than those described above become apparent through the following description of embodiments.

DETAILED DESCRIPTION OF THE PREFERRED EMBODIMENTS

First Embodiment

Figure 1:
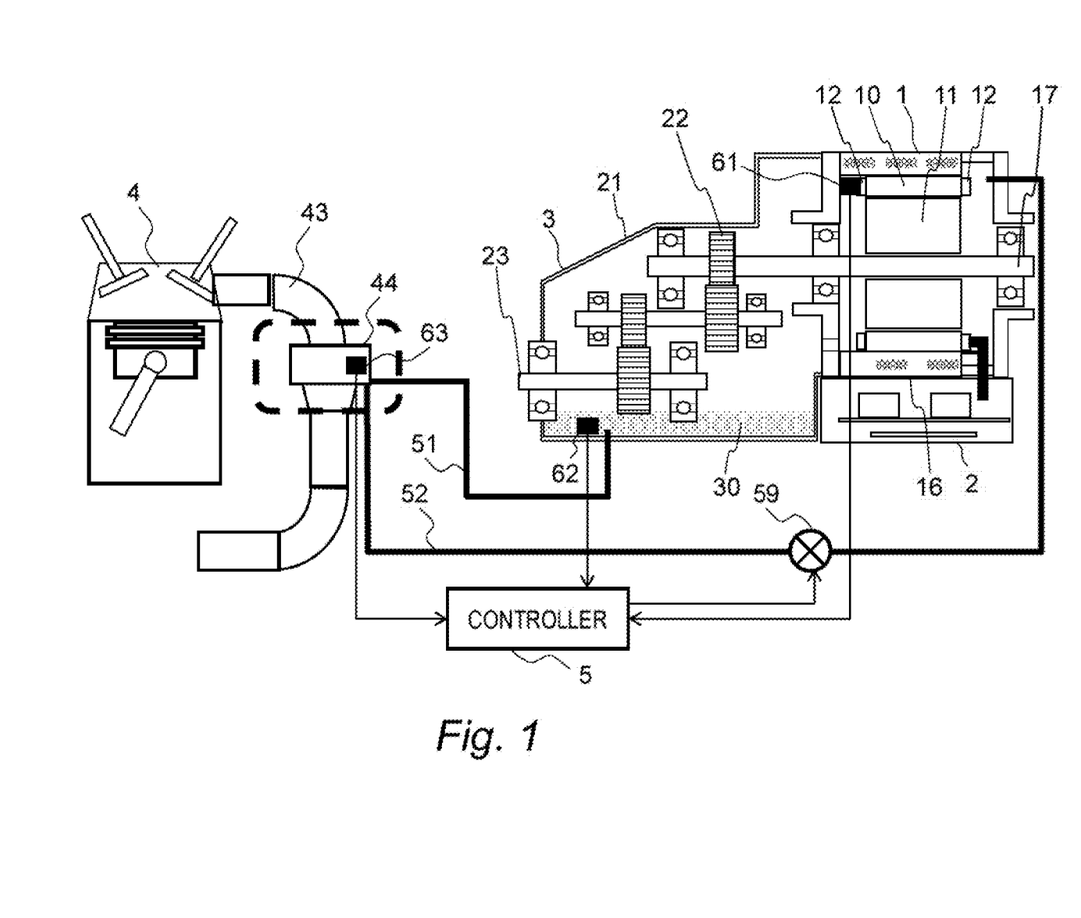
FIG. 1 is a view for illustrating a configuration of a drive system for a vehicle according to a first embodiment of this invention.

FIG. 1 is a view for illustrating a configuration of a drive system for a vehicle according to a first embodiment of this invention.

The drive system according to this embodiment includes a motor 1, a gear assembly 3, an engine 4, and a controller 5. The gear assembly 3 is arranged on an output side of the motor 1.

The motor 1 includes a stator 10 and a rotor 11 arranged on a radially inner side of the stator 10. A winding 12 is wound around the stator 10. The motor 1 may be, for example, a permanent-magnet electric motor including permanent magnets, a synchronous electric motor including a field winding, an induction electric motor including a cage-shaped conductor, or a reluctance motor in which a rotor includes only a rotor core. Components for causing a rotor to generate a magnetic field and shapes thereof are not limited. The stator 10 is fixed on an inner peripheral side of a frame 16 by, for example, shrink fit. The frame 16 is formed by, for example, low-pressure casting or die casting. A shape and dimensions of the frame 16 including a bracket for supporting bearings are not limited. The winding 12 is formed by distributed winding or concentrated winding. The winding 12 may be formed of any of a square wire or a round wire. A winding method and a kind of winding are not limited.

A current and a voltage output from an inverter 2 cause a current to flow through the winding 12, and generate a rotating magnetic field. The rotating magnetic field rotates the rotor 11 so that the motor 1 generates torque. The rotor 11 is coupled to the gear assembly 3 through intermediation of a shaft 17. When a gear output shaft 23 of the gear assembly 3 is coupled to an axle, a vehicle is driven. Further, the motor 1 is not required to be a motor for drive that converts electric energy into kinetic energy for a vehicle, but may be a motor for regeneration that generates electric energy from kinetic energy for a vehicle. The motor 1 may also be used for both drive and regeneration. Further, the motor 1 may be cooled with refrigerant such as water. At this time, it is preferred that a lubricating oil 30 be heated to a temperature higher than that of the refrigerant.

The gear assembly 3 includes a gear box 21 and a plurality of gears 22 arranged therein. A gear ratio of the gears 22 is determined so as to decelerate a rotation speed of the motor 1. In FIG. 1, the gears 22 are parallel-axis spur gears. However, the gears 22 may be all planetary gears or a combination of a planetary gear and a spur gear. Whether the gears 22 have a parallel-axis configuration or a uniaxial configuration and a gear ratio of the gears 22 are not limited. Although illustration is omitted, in general, a differential gear is arranged between the gear assembly 3 and the axle.

As illustrated with small dots in FIG. 1, the lubricating oil 30 is stagnant in a lower part of the gear assembly 3. The lubricating oil 30 flows between the motor 1 and the gear assembly 3 to lubricate and cool the motor 1 and the gears 22. A part of the gears 22 in the gear assembly 3 is immersed in the lubricating oil 30. Along with the rotation of the gears 22, the lubricating oil 30 is diffused inside the gear assembly 3 to lubricate the gears 22.

The engine 4 is an internal combustion engine including a cylinder and a piston provided in the cylinder. The engine 4 generates torque for travel and/or drives the electric motor. A catalytic converter 44 is provided to an exhaust pipe 43. Exhaust-gas purification performance of a three-way catalyst included in the catalytic converter 44 does not become effective at a low temperature, and a catalyst temperature is required to exceed 500° C. Meanwhile, a temperature of an exhaust gas from the engine 4 widely ranges from about 200° C., which is a temperature during idling, to about 800° C., which is a temperature during a full-load operation. Thus, the purification performance of the catalyst cannot become effective at the time of cold start.

Thus, the drive system according to this embodiment includes oil paths for circulating the lubricating oil 30 through the gear assembly 3 and the catalytic converter 44.

The oil paths according to this embodiment include an oil path 51 and an oil path 52. The oil path 51 allows the lubricating oil 30 to be introduced from the gear assembly 3 into the catalytic converter 44. The oil path 52 allows the lubricating oil 30 to return from the catalytic converter 44 to the motor 1. It is preferred that the oil path 52 extend downwardly from the catalytic converter 44 so that the lubricating oil 30 in the catalytic converter 44 exits under the gravity. A pump 59 for circulating the lubricating oil 30 is provided in the oil path 52. Details of operating conditions of the pump 59 are described later. It is preferred that the pump 59 be set to operate when a temperature of the catalytic converter 44 is lower than an oil temperature. It is preferred that the pump 59 be provided on a downstream side of the catalytic converter 44 to suck the lubricating oil 30 stagnant in the catalytic converter 44. The lubricating oil 30 that has been cooled in the catalytic converter 44 flows into the pump 59. Thus, the lubricating oil 30 having a high temperature does not flow into the pump 59, and thus the pump 59 can be driven under a small temperature load. The lubricating oil 30 that has returned to the motor 1 through the oil path 52 may be directly supplied to the winding 12 of the motor 1, or the lubricating oil 30 discharged through the oil path 52 may be stored inside the motor 1 to cool the winding 12. Further, it is preferred that the winding 12 in contact with the lubricating oil 30 be configured to extend to an outside (coil end) of an outer periphery of the stator 10. The lubricating oil 30 that has cooled the motor 1 is warmed up with the winding 12. After that, the lubricating oil 30 passes through a connecting path between the motor 1 and the gear assembly 3 to stagnate in the lower part of the gear assembly 3.

In this embodiment, the lubricating oil 30 cools a coil of the motor 1, then lubricates the gears 22, and is guided to the catalytic converter 44. Thus, the gears 22 are lubricated with the lubricating oil 30 having a high temperature (specifically, a low viscosity). After that, the lubricating oil 30 having a high temperature supplies heat to the catalyst.

The drive system according to this embodiment includes three temperature sensors 61 to 63. The temperature sensor 61 is provided to the motor 1, and measures a temperature of the winding 12. The temperature sensor 62 is provided to the gear assembly 3, and measures a temperature (oil temperature) of the lubricating oil 30. The temperature sensor 63 is provided to the catalytic converter 44, and measures a temperature of the catalyst. In this embodiment, the pump 59 is switched on and off to be operated based on the temperatures measured by the sensors 61 to 63, respectively. In another embodiment to be described later, in addition to on and off of the pump 59, opening and closing of a valve are controlled based on the temperatures measured by the sensors 61 to 63, respectively.

The controller 5 includes a computer (microcomputer) including an arithmetic device, a memory, and an input/ output device. The controller 5 may be provided separately from the inverter 2 or may be provided in the inverter 2 that controls the motor 1.

The arithmetic device includes a processor, and executes a program stored in the memory. A part of processing, which is performed through the execution of the program by the arithmetic device, may be executed by another arithmetic device (for example, hardware such as a field programmable gate array (FPGA) or an application specific integrated circuit (ASIC)).

The memory includes a ROM and a RAM, which are non-volatile storage elements. The ROM stores, for example, an invariable program (such as a BIOS). The RAM is a high-speed volatile storage element such as a dynamic random access memory (DRAM) and a non-volatile storage element such as a static random access memory (SRAM). The RAM stores a program to be executed by the arithmetic device and data to be used at the time of execution of the program. The program to be executed by the arithmetic device is stored in a non-volatile storage device, which is a non-transitory storage medium for the controller 5.

The input/output device is an interface that transmits a content of processing to an outside and receives data from the outside in accordance with a predetermined protocol.

FIG. 2 to FIG. 5 are views for illustrating a configuration of the catalytic converter 44 according to this embodiment.

Figure 2:
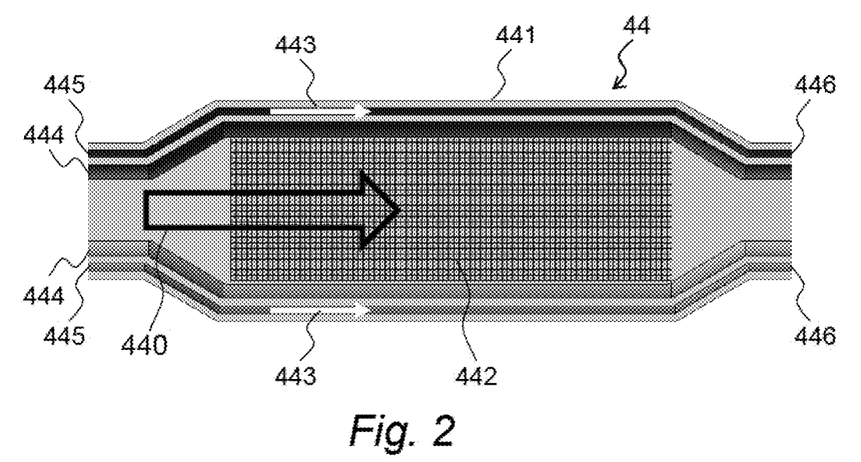
FIG. 2 is a view for illustrating a configuration of the catalytic converter according to this embodiment.

The catalytic converter 44 illustrated in FIG. 2 includes a case 441. The case 441 contains a catalyst 442, and allows the exhaust gas to pass therethrough. The case 441 has a side wall having a double-layered structure. The catalytic converter 44 has an oil passage 443 for the lubricating oil 30 inside the case 441. The oil passage 443 has an inflow port 445 and an outflow port 446. The lubricating oil 30 flows into the inflow port 445 in an inflow direction of the exhaust gas (indicated by an arrow 440). The lubricating oil 30 flows out from the outflow port 446 in an outflow direction of the exhaust gas. An air layer 444 is defined by the case 441 and the catalyst 442. The air layer 444 functions as a heat insulator so as to prevent a sudden increase in temperature of the catalyst 442, which may be caused by the lubricating oil 30 having a high temperature, or an increase in temperature of the lubricating oil 30, which may be caused by the exhaust gas having a high temperature.

Figure 3:
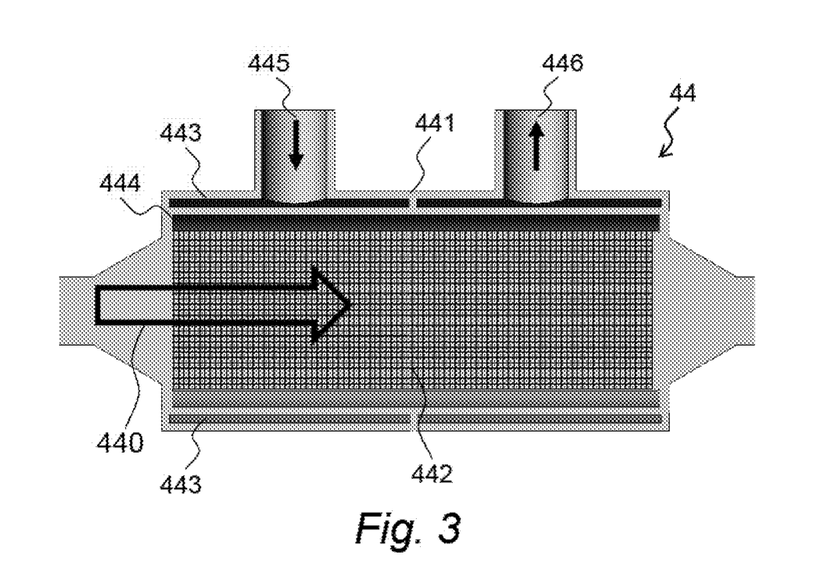
FIG. 3 is a view for illustrating a configuration of the catalytic converter according to this embodiment.

A catalytic converter 44 illustrated in FIG. 3 includes a case 441. The case 441 contains a catalyst 442, and allows the exhaust gas to pass therethrough. The case 441 has a side wall having a double-layered structure. The catalytic converter 44 has an oil passage 443 for the lubricating oil 30 inside the case 441. An arrow 440 in FIG. 3 indicates the direction in which the exhaust gas flows. The case 441 has an inflow port 445 and an outflow port 446. The lubricating oil 30 flows into the case 441 in a radial direction through the inflow port 445. The lubricating oil 30 flows out in the radial direction through the outflow port 446. An air layer 444 is defined by the case 441 and the catalyst 442. The air layer 444 functions as a heat insulator so as to prevent a sudden increase in temperature of the catalyst 442, which may be caused by the lubricating oil 30 having a high temperature, or an increase in temperature of the lubricating oil 30, which may be caused by the exhaust gas having a high temperature.

Figure 4:
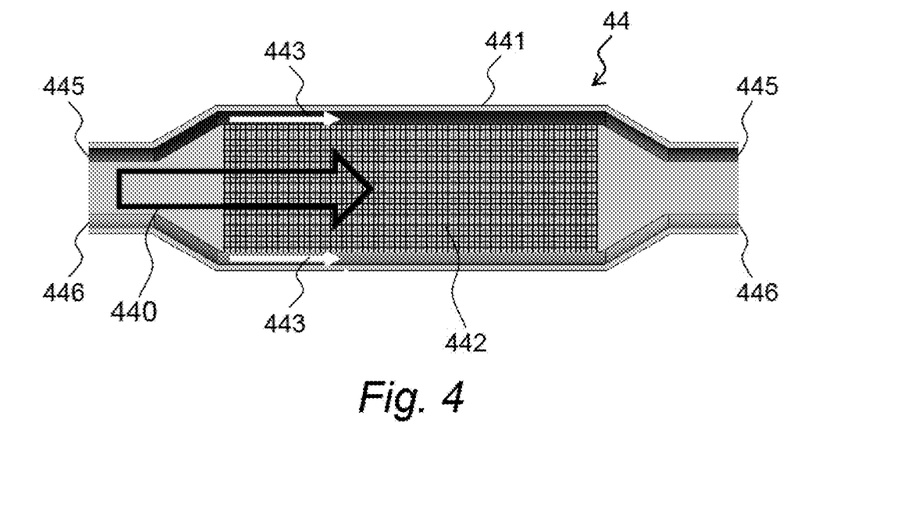
FIG. 4 is a view for illustrating a configuration of the catalytic converter according to this embodiment.

A catalytic converter 44 illustrated in FIG. 4 has an oil passage 443 for the lubricating oil 30. The oil passage 443 extends along an inner surface of a side wall of a case 441 that stores a catalyst 442 and allows the exhaust gas to pass therethrough. The oil passage 443 has an inflow port 445 and an outflow port 446. The lubricating oil 30 flows into the case 441 through the inflow port 445 in an inflow direction of the exhaust gas (indicated by an arrow 440). The lubricating oil 30 flows out of the case 441 through the outflow port 446 in an outflow direction of the exhaust gas. The catalytic converter 44 illustrated in FIG. 4 does not have an air layer. However, when the lubricating oil 30 is controlled to flow in a sufficient amount, an increase in temperature of the lubricating oil 30 can be prevented without an air layer.

Figure 5:
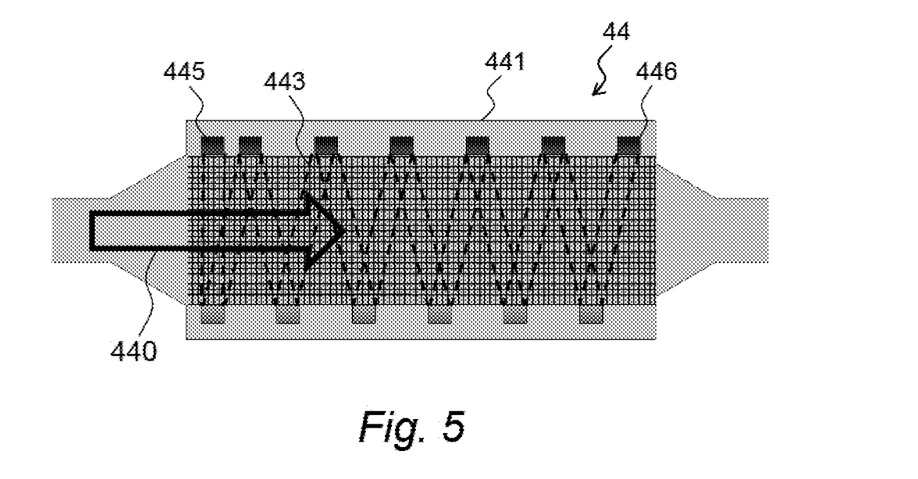
FIG. 5 is a view for illustrating a configuration of the catalytic converter according to this embodiment.

A catalytic converter 44 illustrated in FIG. 5 has an oil passage 443 having a helical structure inside a case 441. The oil passage 443 may be formed in an inner surface or an outer surface of the case 441. The oil passage 443 has an inflow port 445 and an outflow port 446 at its ends. The lubricating oil 30 flows into the case 441 through the inflow port 445, and flows out of the case 441 through the outflow port 446. The catalytic converter 44 illustrated in FIG. 5 may be with or without an air layer. An arrow 440 in FIG. 5 indicates a direction in which the exhaust gas flows.

Figure 6:
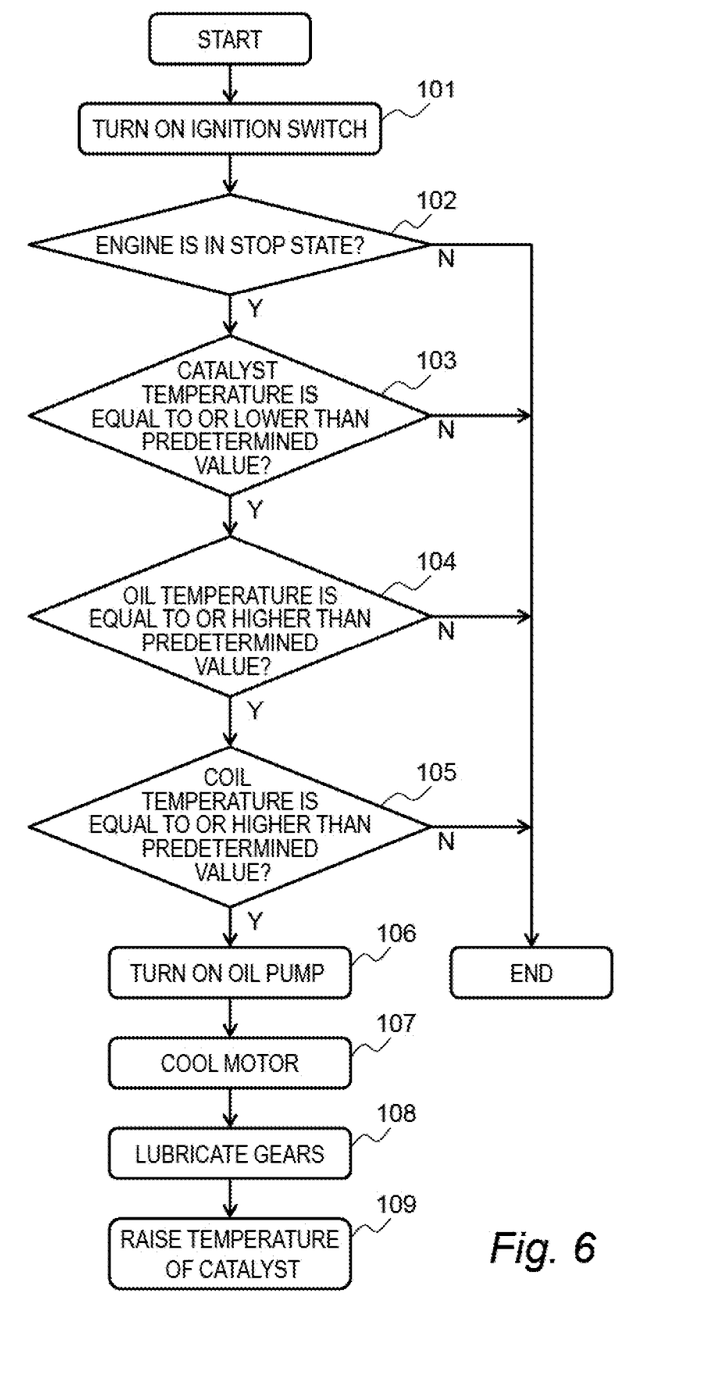
FIG. 6 is a flowchart for illustrating an example of control on the drive system according to this embodiment.

FIG. 6 is a flowchart for illustrating an example of control on the drive system according to this embodiment.

When turn-on of an ignition switch is detected, control on the drive system according to this flowchart starts (Step 101).

After that, the controller 5 determines whether or not the engine 4 is in a stop state (Step 102). In Step 102, elapsed time from the last start of the engine 4 to the achievement of sufficient warm-up of the catalyst 442 may be determined. When the engine 4 is operating, it is assumed that the catalyst 442 has been warmed up with the exhaust gas. Thus, the processing is terminated.

Meanwhile, when the engine 4 is in a stop state, it is assumed that the catalyst 442 is cold. Thus, it is determined whether or not a temperature of the catalyst 442 is equal to or lower than a predetermined threshold value (for example, 550° C.) (Step 103). When the temperature of the catalyst 442 is higher than the predetermined threshold value, the catalyst 442 is not required to be warmed up. Thus, this processing is terminated.

Meanwhile, when the temperature of the catalyst 442 is equal to or lower than the predetermined threshold value, the catalyst 442 is required to be warmed up. Thus, it is determined whether or not the temperature of the lubricating oil 30 is equal to or higher than a predetermined threshold value (Step 104). When the temperature of the lubricating oil 30 is lower than the predetermined threshold value, the catalyst 442 cannot be warmed up. Thus, this processing is terminated. The determination relating to the temperature of the catalyst 442 and the determination relating to the oil temperature may be made in Step 103 and Step 104 not by comparing the temperature of the catalyst 442 and the oil temperature with the predetermined threshold values, respectively, but by first determining whether or not the temperature of the lubricating oil 30 is higher than the temperature of the catalyst 442. In this case, when the temperature of the lubricating oil 30 is higher than the temperature of the catalyst 442, the processing may proceed to Step 105.

Meanwhile, when the temperature of the lubricating oil 30 is higher than the predetermined threshold value, the lubricating oil 30 can warm up the catalyst 442. Thus, it is determined whether or not the temperature of the winding 12 is equal to or higher than a predetermined threshold value (Step 105). When the temperature of the winding 12 is lower than the predetermined threshold value, the winding 12 cannot warm up the lubricating oil 30, and thus cannot warm up the catalyst 442. Thus, this processing is terminated.

Meanwhile, when the temperature of the winding 12 is equal to or higher than the predetermined threshold value, the winding 12 can warm up the lubricating oil 30. Thus, the pump 59 is operated to circulate the lubricating oil 30 through the oil paths (Step 106). The motor 1 is cooled with the lubricating oil 30 that has been cooled in the catalytic converter 44 (Step 107). The gears 22 are lubricated with the lubricating oil 30 that has been warmed up in the motor 1 (Step 108). The lubricating oil 30 that has been warmed up in the motor 1 is circulated through the catalytic converter 44 to heat the catalyst 442 to thereby raise the temperature of the catalyst 442 (Step 109).

Specifically, the pump 59 is controlled to operate under a state in which the catalyst 442 has not been warmed up. When the catalyst 442 has been warmed up and the coil temperature is sufficiently high for warming up the catalyst 442, the pump 59 is controlled to operate. When the lubricating oil 30 having a high temperature, which has not been sufficiently cooled, is circulated after the temperature of the catalyst 442 has risen, the temperature of the winding 12 may become higher, which may result in burnout of the winding 12. Thus, when the temperature of the lubricating oil 30 is high, it is necessary to circulate a large amount of the lubricating oil 30 to perform control so as to lower the temperatures of the lubricating oil 30 and the winding 12.

Figure 7:
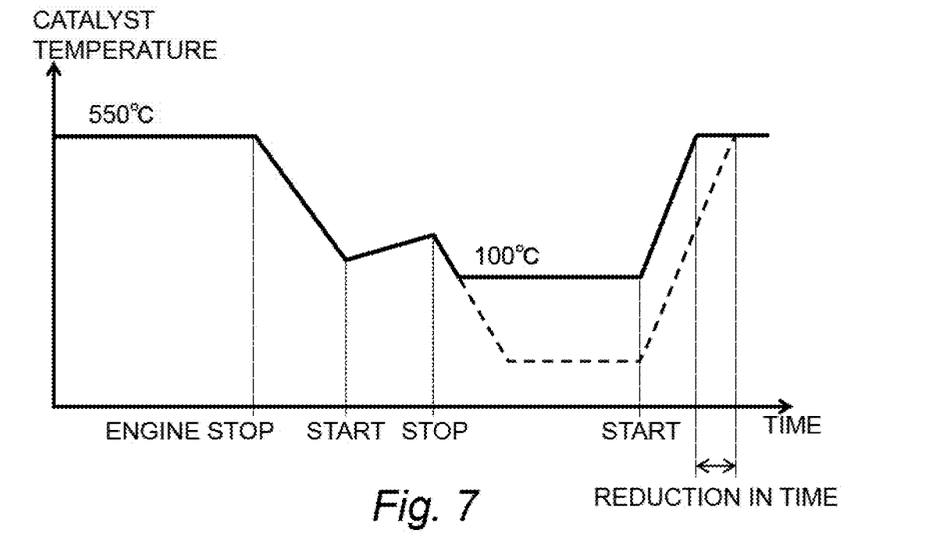
FIG. 7 is a graph for showing a change in temperature of the catalyst in the drive system according to this embodiment.
Figure 8:
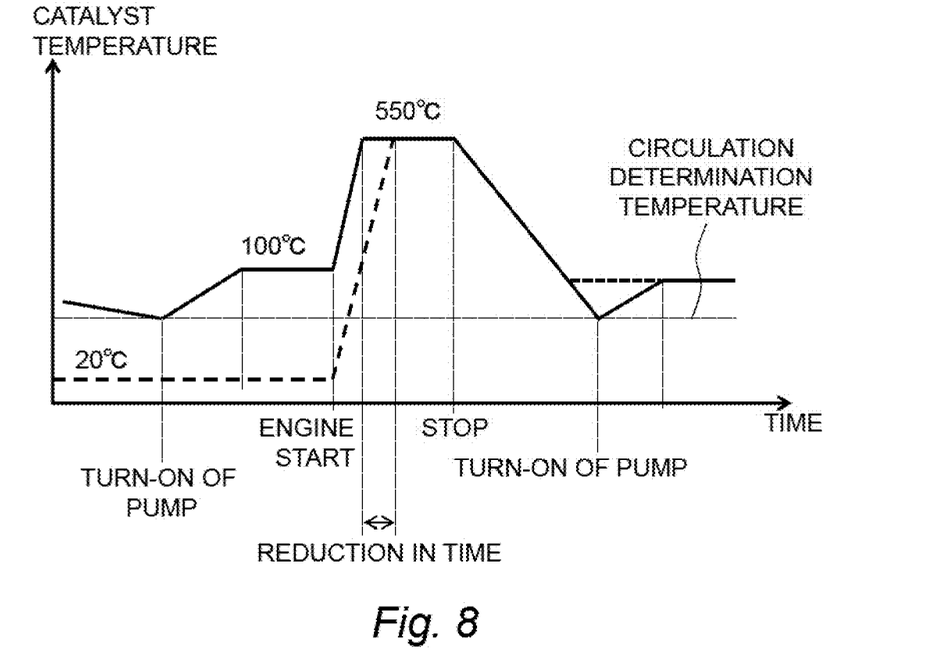
FIG. 8 is a graph for showing a change in temperature of the catalyst in the drive system according to this embodiment.

FIG. 7 and FIG. 8 are graphs each for showing a change in temperature of the catalyst 442 in the drive system according to this embodiment.

As shown in FIG. 7, when the engine 4 operates, the catalyst 442 is warmed up to 550° C. or higher with the exhaust gas from the engine 4. When the engine 4 stops, the temperature of the catalyst 442 decreases. After that, when the engine 4 repeats starting and stopping, the temperature of the catalyst 442 fluctuates. In this embodiment, however, when the motor 1 operates while the engine 4 is in a stop state, the catalyst 442 is warmed up with heat generated from the winding 12. Thus, the temperature of the catalyst 442 is maintained at about 100° C. Hence, in comparison to related-art control for a temperature of a catalyst, which is indicated by a broken line, time required to raise the temperature of the catalyst 442 at the time of start of the engine 4 can be shortened.

Further, as shown in FIG. 8, when the engine 4 stops and the temperature of the catalyst 442 drops to a predetermined threshold value (circulation determination temperature), the pump 59 may be operated to warm up the catalyst 442. In this manner, the catalyst 442 is warmed up to prevent its temperature from decreasing to normal temperature, and is maintained at about 100° C. In this manner, time required to raise the temperature of the catalyst 442 at the time of start of the engine 4 can be shortened.

As described above, in the first embodiment, when the vehicle travels in an electric vehicle (EV) mode for a long period of time (while the engine 4 is in a stop state), the lubricating oil 30 in the gear assembly 3, which has been heated in the motor 1, is allowed to flow through the catalytic converter 44 to warm up the catalyst 442 and keep its temperature. Thus, the operation of the pump 59 is switched to circulate the lubricating oil 30 based on the temperature of the catalyst 442, the temperature of the lubricating oil 30, and the temperature of the winding 12. Further, the motor 1 can be cooled without a heat exchanger for cooling the lubricating oil 30 that has been heated in the motor 1.

Further, time required to raise the temperature of the catalyst 442 can be shortened. Thus, the catalyst converter 44 is not required to be warmed up, resulting in reduced fuel consumption and power consumption. In particular, in a case of an electrically-driven vehicle including an internal combustion engine, such as a plug-in hybrid electric vehicle (PHEV), when the internal combustion engine is in a stop state for a long period of time, an effect of raising the temperature of the catalyst 442 with the exhaust gas cannot be obtained, resulting in a decrease in temperature of the catalyst 442. In this embodiment, however, even when the engine 4 is in a stop state for a long period of time or is frequently stopped, the catalyst 442 can be maintained at a temperature higher than normal temperature.

Second Embodiment

Figure 9:
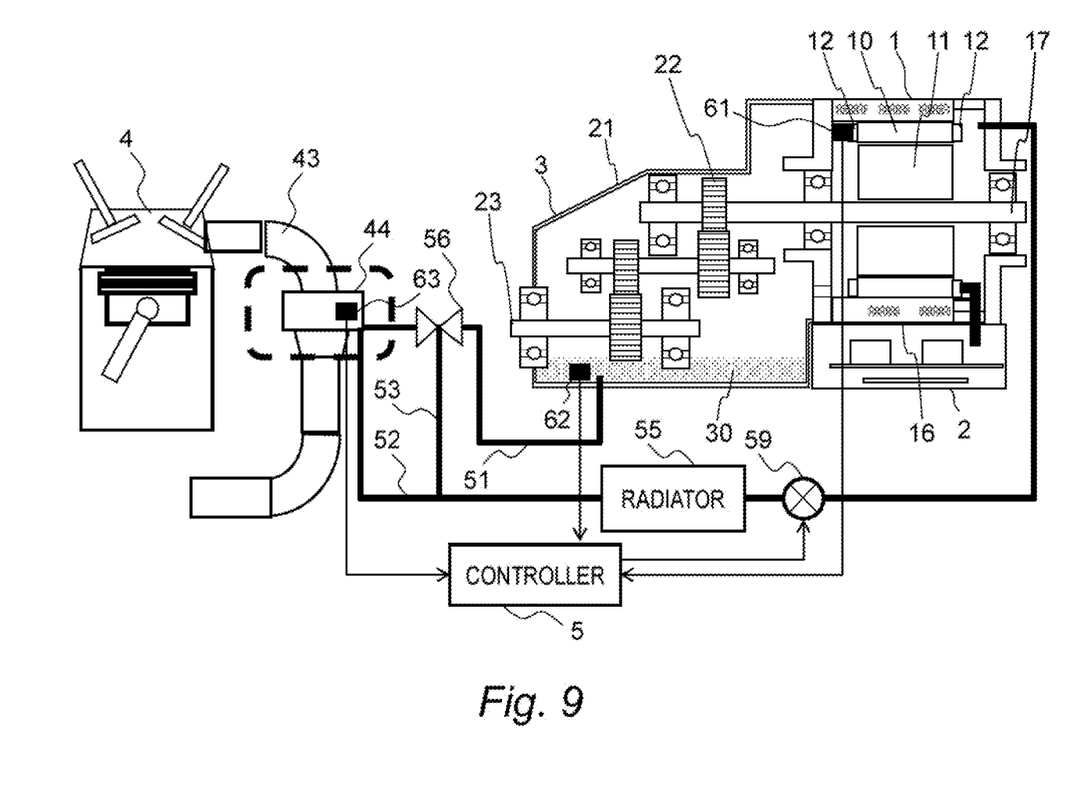
FIG. 9 is a view for illustrating a configuration of a drive system for a vehicle according to a second embodiment of this invention.

FIG. 9 is a view for illustrating a configuration of a drive system for a vehicle according to a second embodiment of this invention.

The drive system according to the second embodiment includes a bypass oil path 53 included in oil paths and a radiator 55 provided in the oil path. In the second embodiment, components different from those of the above-mentioned drive system according to the first embodiment are mainly described, and a description of components having the same functions as those of the drive system according to the first embodiment is omitted.

The drive system according to this embodiment includes a motor 1, a gear assembly 3, an engine 4, and a controller 5.

The oil paths according to this embodiment includes an oil path 51, an oil path 52, and the bypass oil path 53. The oil path 51 allows a lubricating oil 30 to be introduced from the gear assembly 3 into a catalytic converter 44. The oil path 52 allows the lubricating oil 30 to return from the catalytic converter 44 to the motor 1. The bypass oil path 53 connects the oil path 51 and the oil path 52 to each other, bypassing the catalytic converter 44. A valve 56 is provided at a branch point at which the bypass oil path 53 branches from the oil path 51. When the valve 56 is in an open state, the lubricating oil 30 flows from the gear assembly 3 into the catalytic converter 44. When the valve 56 is in a closed state, the lubricating oil 30 flows from the gear assembly 3 into the bypass oil path 53 without flowing into the catalytic converter 44.

It is preferred that the oil path 52 extend downwardly from the catalytic converter 44 so that the lubricating oil 30 in the catalytic converter 44 exits under the gravity. The radiator 55 for cooling the lubricating oil 30 that has been heated in the motor 1 is provided in the oil path 52. Further, a pump 59 for circulating the lubricating oil 30 is provided on a downstream side of the radiator 55 in the oil path 52. As described in the first embodiment, it is preferred that the pump 59 operate when a temperature of the catalytic converter 44 is lower than an oil temperature. It is preferred that the pump 59 be provided on a downstream side of the catalytic converter 44 to suck the lubricating oil 30 stagnant in the catalytic converter 44. The lubricating oil 30 that has returned to the motor 1 through the oil path 52 may be directly supplied to the winding 12 of the motor 1, or the lubricating oil 30 discharged from the oil path 52 may be stored in the motor 1 to cool the winding 12. Further, it is preferred that the winding 12 in contact with the lubricating oil 30 extend to an outside (coil end) of an outer periphery of a stator 10. After the lubricating oil 30, which has cooled the motor 1, is warmed up with the winding 12, the lubricating oil 30 passes through a connecting path between the motor 1 and the gear assembly 3 to stagnate in a lower part of the gear assembly 3.

In this embodiment, after cooling a coil of the motor 1, the lubricating oil 30 lubricates the gears 22 and is then guided to the catalytic converter 44. Thus, the gears 22 are lubricated with the lubricating oil 30 having a high temperature (specifically, a low viscosity). After that, the lubricating oil 30 having a high temperature supplies heat to a catalyst. Further, when the temperature of the catalytic converter 44 becomes higher, the valve 56 is closed. In this manner, the lubricating oil 30 flowing from the gear assembly 3 is allowed to bypass the catalytic converter 44 and flow into the bypass oil path 53. As a result, the lubricating oil 30 is prevented from coming into contact with the catalyst 442 having a high temperature to thereby suppress degradation of the lubricating oil 30.

Further, the radiator 55 is provided on the downstream side of the catalytic converter 44. Thus, the lubricating oil 30 having a temperature increased in the motor 1 can transfer heat to the catalytic converter 44 before releasing heat in the radiator 55. Further, the lubricating oil 30 that has been cooled in the catalytic converter 44 is further cooled by the radiator 55 to thereby improve cooling efficiency for the motor 1.

Still further, the pump 59 is provided on a downstream side of the radiator 55. Thus, the lubricating oil 30 that has been cooled in the radiator 55 flows into the pump 59. Thus, the lubricating oil 30 having a high temperature does not flow into the pump 59. As a result, the pump 59 can be driven under a small temperature load state.

Third Embodiment

Figure 10:
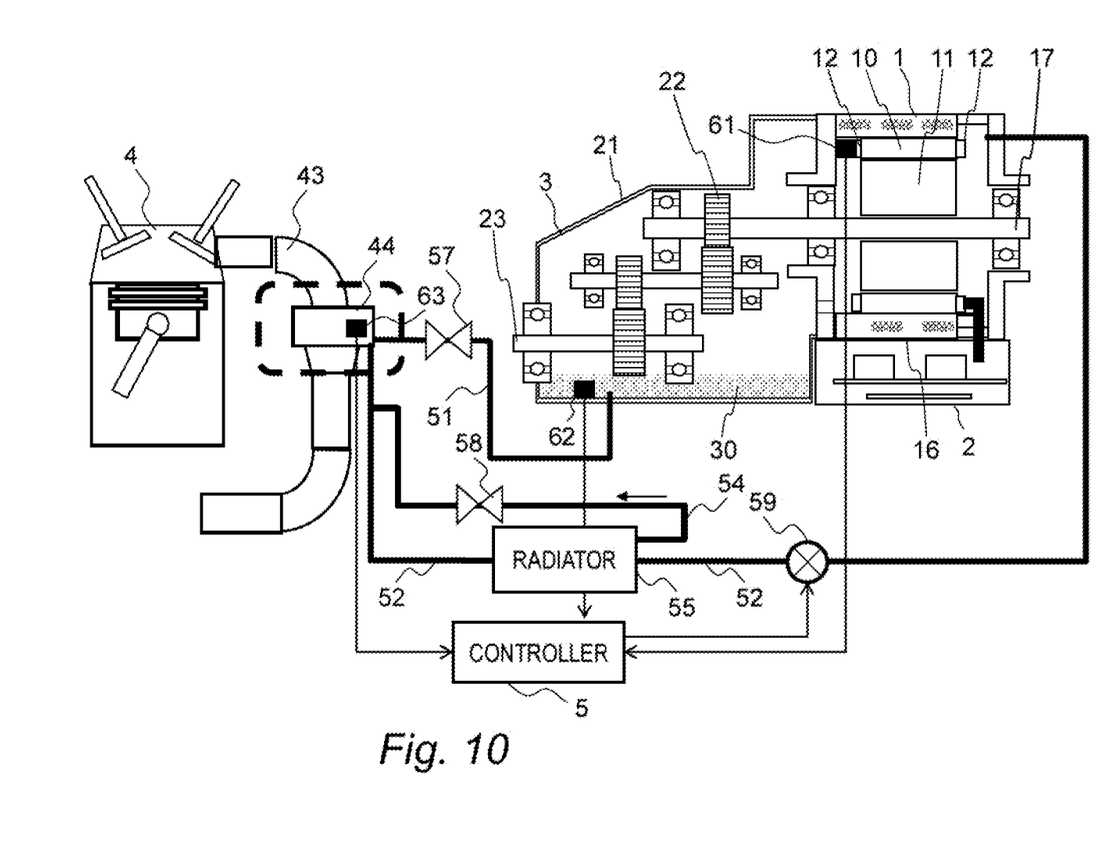
FIG. 10 is a view for illustrating a configuration of a drive system for a vehicle according to a third embodiment of this invention.

FIG. 10 is a view for illustrating a configuration of a drive system for a vehicle according to a third embodiment of this invention.

The drive system according to the third embodiment includes a circulation oil path 54 included in oil paths and a radiator 55 provided in the oil path. In the third embodiment, components different from those of the above-mentioned drive systems according to the first embodiment and the second embodiment are mainly described, and a description of components having the same functions as those of the drive systems according to the first embodiment and the second embodiment is omitted.

The oil paths according to this embodiment includes an oil path 51, an oil path 52, and the circulation oil path 54. The oil path 51 allows a lubricating oil 30 to be introduced from a gear assembly 3 into a catalytic converter 44. The oil path 52 allows the lubricating oil 30 to return from the catalytic converter 44 to the motor 1. The circulation oil path 54 allows the lubricating oil 30 to circulate in the radiator 55. A valve 57 is provided on an upstream side of the catalytic converter 44. When the valve 57 is in an open state, the lubricating oil 30 flowing from the gear assembly 3 flows into the catalytic converter 44. When the valve 57 is in a closed state, the lubricating oil 30 flowing from the gear assembly 3 does not flow into the catalytic converter 44.

It is preferred that the oil path 52 extend downwardly from the catalytic converter 44 so that the lubricating oil 30 in the catalytic converter 44 exits under the gravity. The radiator 55 for cooling the lubricating oil 30 that has been heated in the motor 1 is provided in the oil path 52. Further, a pump 59 for circulating the lubricating oil 30 is provided on a downstream side of the radiator 55 in the oil path 52. As described in the first embodiment, it is preferred that the pump 59 operate when a temperature of the catalytic converter 44 is lower than an oil temperature. It is preferred that the pump 59 be provided on a downstream side of the catalytic converter 44 to suck the lubricating oil 30 stagnant in the catalytic converter 44. The lubricating oil 30 that has returned to the motor 1 through the oil path 52 may be directly supplied to the winding 12 of the motor 1, or the lubricating oil 30 discharged from the oil path 52 may be stored in the motor 1 to cool the winding 12. Further, it is preferred that the winding 12 in contact with the lubricating oil 30 extend to an outside (coil end) of an outer periphery of a stator 10. After the lubricating oil 30, which has returned to the motor 1, is warmed up with the winding 12, the lubricating oil 30 passes through a connecting path between the motor 1 and the gear assembly 3 to stagnate in a lower part of the gear assembly 3.

The circulation oil path 54 is formed so as to bring a part of the oil path 52, which is in the vicinity of an outlet of the catalytic converter 44 for the lubricating oil 30, and an outlet of the radiator 55 for the lubricating oil 30 into with each other. A valve 58 is provided in the middle of the circulation oil path 54. A circulation pump may be provided in the middle of the circulation oil path 54. When the lubricating oil 30 is to be normally circulated, the valve 58 is closed. Meanwhile, when the catalytic converter 44 has a high temperature and the lubricating oil 30 has a high temperature, the valve 57 is closed and the valve 58 is opened. As a result, the lubricating oil 30 having a high temperature can be efficiently cooled in the radiator 55. Meanwhile, when the temperature of the lubricating oil 30 decreases, the valve 57 is opened and the valve 58 is closed. As a result, the lubricating oil 30 is circulated through the catalytic converter 44 and the radiator 55 to thereby cool the lubricating oil 30 that has been heated in the motor 1.

In this embodiment, after cooling a coil of the motor 1, the lubricating oil 30 lubricates the gears 22 and is then guided to the catalytic converter 44. Thus, the gears 22 are lubricated with the lubricating oil 30 having a high temperature (specifically, a low viscosity). After that, the lubricating oil 30 having a high temperature supplies heat to a catalyst. When the catalytic converter 44 has a high temperature, the lubricating oil 30 is circulated through the radiator 55 via the circulation oil path 54. In this manner, the lubricating oil 30 is efficiently cooled to thereby suppress the degradation of the lubricating oil 30.

Further, the radiator 55 is provided on the downstream side of the catalytic converter 44. Thus, the lubricating oil 30 having a temperature increased in the motor 1 can transfer heat to the catalytic converter 44 before releasing heat in the radiator 55. Further, the lubricating oil 30 that has been cooled in the catalytic converter 44 is further cooled by the radiator 55 to thereby improve cooling efficiency for the motor 1.

Still further, the pump 59 is provided on a downstream side of the radiator 55. Thus, the lubricating oil 30 that has been cooled in the radiator 55 flows into the pump 59. Thus, the lubricating oil 30 having a high temperature does not flow into the pump 59. As a result, the pump 59 can be driven under a small temperature load state.

As described above, the drive system according to the embodiments of this invention includes the internal combustion engine (engine 4), the catalytic unit (catalytic converter 44) that purifies the exhaust gas from the internal combustion engine, the motor 1 used for at least one of drive or regeneration, and the flow paths (oil paths 51, 52 and 53) formed so as to allow the oil-based medium (lubricating oil 30) for lubricating the motor 1 to flow in the vicinity of the catalytic unit (catalyst 442). The oil-based medium 30 is heated in the motor 1, and exchanges heat in the catalytic converter 44 to thereby heat the catalyst 442. Thus, the use of the oil-based medium 30 that can have a temperature higher than a temperature of water improves warm-up efficiency for the catalytic converter 44, and the catalytic converter 44 can be more quickly warmed up to a high temperature and start keeping its temperature earlier in comparison to a case in which a catalytic converter is warmed up with cooling water to a temperature falling within a range of from 65° C. to 90° C. and keeps its temperature. A fuel consumption for warming up the catalytic converter 44 and keeping its temperature can be reduced.

Further, the drive system includes the gear assembly 3 that transmits the output from the motor 1 via the gears 22, and uses the lubricating oil 30 for lubricating the gears 22 as the oil-based medium. Specifically, a transmission oil is circulated through the catalytic converter 44 to thereby warm up the catalytic converter 44 and raise the temperature of the catalytic converter 44. After cooling the winding 12 of the motor 1, the lubricating oil 30 is supplied to the transmission and is then introduced into the catalytic converter 44. Thus, the lubricating oil 30 is maintained at a high temperature to thereby warm up the catalytic converter 44. In comparison to a case in which the lubricating oil 30 is directly introduced from the motor 1 into the catalytic converter 44, the gear assembly 3 can be lubricated with the lubricating oil 30 having a high temperature and a low viscosity. Thus, lubrication resistance of the gear assembly 3 can be reduced.

Still further, the oil-based medium 30 is heated by cooling the winding 12 of the motor 1 through contact with the winding 12. Thus, raising the temperature of the oil-based medium 30 allows heat to be used to warm up the catalyst 442 after the lubrication resistance of the gear assembly 3 is reduced.

Still further, the motor 1 is cooled with the refrigerant, and the oil-based medium 30 is heated to a temperature higher than a temperature of the refrigerant. Thus, in comparison to a case in which the catalytic converter 44 is warmed up with cooling water, the use of the oil-based medium 30 allows the catalytic converter 44 to be warmed up to a high temperature and its temperature to be kept.

Still further, the drive system includes the valves 56 and 57 that control the oil-based medium 30 so as to prevent the oil-based medium 30 from flowing in the vicinity of the catalyst 442 when the temperature of the catalyst 442 is higher than the predetermined threshold value. Thus, when warm-up is not needed, the temperature of the lubricating oil 30 is not increased to a high temperature. As a result, the degradation of the lubricating oil 30 can be prevented.

Still further, the drive system includes the pump 59 that allows the oil-based medium 30 to circulate. When the temperature of the motor 1 is lower than the predetermined threshold value, the pump 59 is controlled so as to prevent the oil-based medium 30 from flowing in the vicinity of the catalyst 442. Thus, when warm-up is impossible, energy consumption, which may otherwise be increased by the pump 59, can be reduced.

This invention is not limited to the above-described embodiments but includes various modifications. The above-described embodiments are explained in details for better understanding of this invention and are not limited to those including all the configurations described above. A part of the configuration of one embodiment may be replaced with that of another embodiment; the configuration of one embodiment may be incorporated to the configuration of another embodiment. A part of the configuration of each embodiment may be added, deleted, or replaced by that of a different configuration.

The above-described configurations, functions, processing modules, and processing means, for all or a part of them, may be implemented by hardware: for example, by designing an integrated circuit, and may be implemented by software, which means that a processor interprets and executes programs providing the functions.

The information of programs, tables, and files to implement the functions may be stored in a storage device such as a memory, a hard disk drive, or an SSD (a Solid State Drive), or a storage medium such as an IC card, or an SD card.

The drawings illustrate control lines and information lines as considered necessary for explanation but do not illustrate all control lines or information lines in the products. It can be considered that almost of all components are actually interconnected.

What is claimed is:

1. A drive system, comprising:
   an internal combustion engine;
   a catalytic unit configured to purify an exhaust gas from the internal combustion engine;
   a motor used for at least one of drive or regeneration; and
   an oil flow path formed within a wall of the catalytic unit so as to allow an oil-based medium for lubricating the motor to flow in the catalytic unit,
   wherein the oil-based medium is heated in the motor and exchanges heat in the catalytic unit to heat the catalytic unit.

2. The drive system according to claim 1, further comprising a gear assembly configured to transmit an output from the motor via gears,
   wherein the oil-based medium is a lubricating oil for lubricating the gears.

3. The drive system according to claim 1, wherein the oil-based medium is heated by cooling a winding of the motor through contact with the winding.

4. The drive system according to claim 1,
   wherein the motor is cooled with refrigerant, and
   wherein the oil-based medium is heated to a temperature higher than a temperature of the refrigerant.

5. The drive system according to claim 1, further comprising a valve that performs control, when a temperature of the catalytic unit is higher than a predetermined threshold value, so as to prevent the oil-based medium from flowing in the vicinity of the catalytic unit.

6. The drive system according to claim 1, further comprising a pump configured to circulate the oil-based medium through the oil flow path,
   wherein, when a temperature of the motor is lower than a predetermined threshold value, the pump is controlled so as to prevent the oil-based medium from flowing in the vicinity of the catalytic unit.

* * * * *